United States Patent Office 3,646,059
Patented Feb. 29, 1972

3,646,059
PLANT GROWTH REGULATORY
UREIDOPYRAZOLES
Richard K. Brantley, Wilmington, Del., assignor to E. I.
du Pont de Nemours and Company, Wilmington, Del.
No Drawing. Filed May 5, 1969, Ser. No. 822,001
Int. Cl. C07d 49/20
U.S. Cl. 260—310 R      3 Claims

ABSTRACT OF THE DISCLOSURE

Certain ureidopyrazoles, such as (i) 5-(3-phenylureido)-1,3-dimethylpyrazole or (ii) 5-[3-(2-fluorophenyl)ureido]-4-chloro-1,3-dimethylpyrazole, have been found to be effective as plant growth modifiers. The ureidopyrazoles are particularly useful as defoliants on cotton, soybean, and dry bean plants.

DESCRIPTION OF THE INVENTION

Summary

This invention is directed to compounds having the formula:

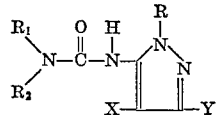

wherein:
R is hydrogen, methyl, ethyl, or phenyl;
$R_1$ is cyclohexyl, phenyl, or

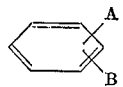

wherein:
A is hydrogen, fluoro, chloro, bromo, or methyl, and
B is hydrogen, chloro, or nitro;
$R_2$ is hydrogen or methyl;
X is hydrogen, methyl, bromo, or chloro; and
Y is methyl or ethyl, and to the use of said compounds as plant growth modifiers.

The preferred compounds are 5-(3-phenylureido)-1,3-dimethylpyrazole and 5-[3-(2-fluorophenyl)ureido]-4-chloro-1,3-dimethylpyrazole.

Method for preparing compounds

The compounds of this invention can be prepared according to the following exemplary reaction schemes:

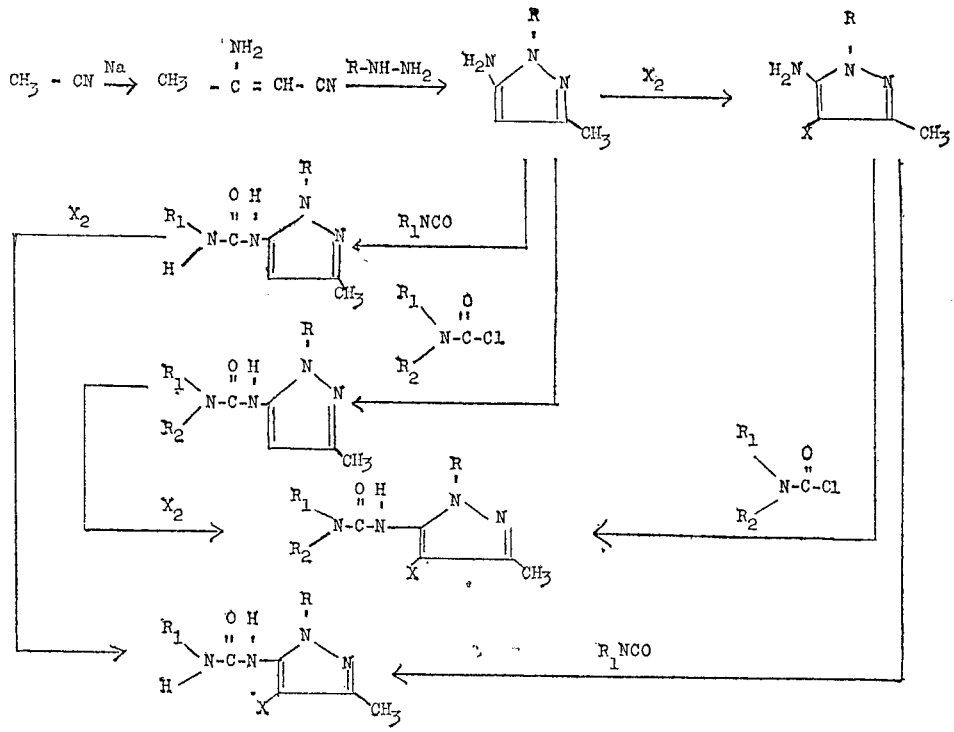

Reaction Scheme 1

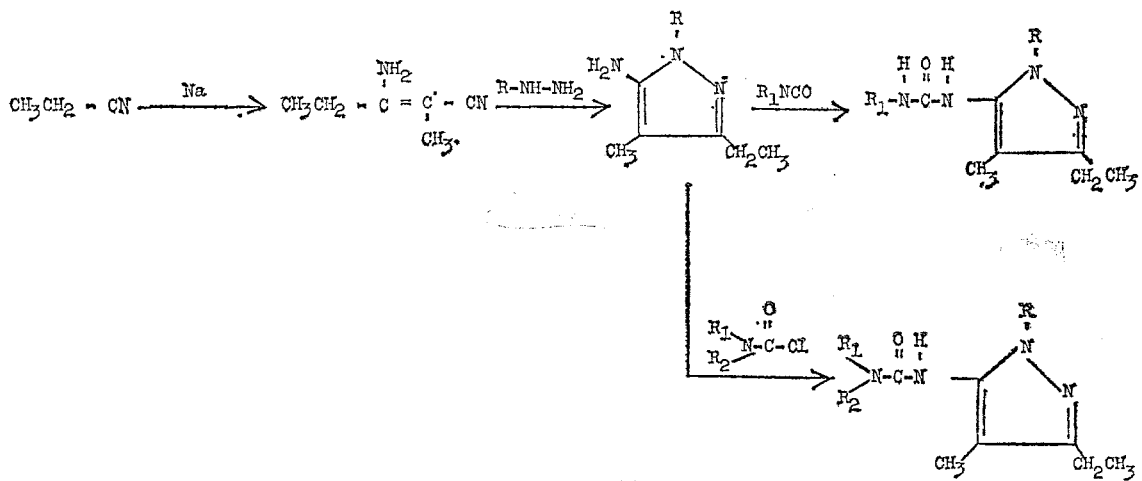

Reaction Scheme 2

Dimerization of a nitrile leads to the formation of an aminonitrile. The nitrile can be dimerized by using methods well known in the art. These methods generally consist of heating the nitrile with or without a solvent in the presence of a strongly alkaline material. Preferred alkalis are alkali and alkaline earth metals as well as their hydrides and alkoxides. The aminonitrile is recovered from the reaction mixture by acidification, filtration, and distillation. The preparation of the aminopyrazole can be carried out by heating the aminonitrile and substituted hydrazine to a temperature of from 50° C. to 150° C. in the presence of a solvent, such as ethyl alcohol. At this point, halogenation of the 4-position may be performed by reacting the aminopyrazole with a halogenating agent, such as bromine or sulfuryl chloride, in the presence of a solvent, such as water, acetic acid, or carbon tetrachloride, and optionally an acid acceptor, such as sodium acetate or sodium carbonate. The halogenated or non-halogenated aminopyrazoles can be reacted with either an organic monoisocyanate, an N-(hydrocarbyl)carbamoyl halide, or an N,N-di(hydrocarbyl)carbamoyl halide. The reaction of the aminopyrazole and isocyanate readily occurs in a non-polar solvent, such as benzene. A catalytic amount of a tertiary amine, such as triethylamine, often is desirable to catalyze the reaction. The reaction of the aminopyrazole and the carbamoyl halide occurs in an inert solvent, such as benzene. The presence of an acid acceptor in the reaction mixture is desirable. Suitable acid acceptors include tertiary amines, such as pyridine, or an excess of the aminopyrazole. The ureidopyrazole can be recovered by stripping off the solvent and recrystallization of the residue. The halogenation of the 4-position can be carried out subsequent to the reaction of the aminopyrazole and the isocyanate or carbamoyl halide in the same manner as the aminopyrazole.

The compounds of this invention can be considered to be substituted ureas. When $R_2$ is not hydrogen, the portion of the molecule which contains $R_1$ and $R_2$ is derived from an N,N-di(hydrocarbyl)carbamoyl halide. When $R_2$ is hydrogen, the $R_1$ portion of the molecule is derived from an isocyanate.

The following examples illustrate the preparation of the compounds of this invention. Unless otherwise stated, parts are parts by weight.

EXAMPLE 1

Preparation of 5-amino-1,3-dimethylpyrazole

Eight and two-tenths parts of β-aminocrotonitrile and 4.5 parts of methylhydrazine are dissolved in 100 parts of ethanol and boiled under reflux for 12 hours. The mixture is then subjected to distillation at reduced pressure. The fraction which has a boiling point of 155° C. at 32 mm. Hg. absolute is 5-amino-1,3-dimethylpyrazole. When this material is collected and cooled, it crystallizes and shows a melting point of 69–70° C. The compound has the following structure:

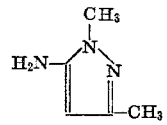

An equivalent amount of hydrazine can be substituted for the methylhydrazine used in the procedure of Example 1. This substitution will yield 5-amino-3-methylpyrazole. Likewise the substitution of ethylhydrazine and phenylhydrazine in the procedure of Example 1 will lead to the formation of 5 - amino-1-ethyl-3-methylpyrazole and 5-amino-1-phenyl-3-methylpyrazole, respectively.

The above mentioned pyrazoles can be reacted with isocyanates according to the procedures of Examples 3 or 8, infra, to give appropriate ureidopyrazoles. Thus, if 5-amino-3-methylpyrazole is reacted with phenyl isocyanate or cyclohexyl isocyanate the respective products will be 5-(3-phenylureido)-3-methylpyrazole and 5-(3-cyclohexylureido)-3-methylpyrazole.

Dimerization of propionitrile will yield 2 - cyano-3-amino-2-pentene. When an equivalent amount of this material is used in place of β-aminocrotonitrile in the procedure of Example 1, 5-amino-3-ethyl-1,4-dimethylpyrazole will be produced. This pyrazole can be reacted with an isocyanate according to the procedures of Example 3 or 8, infra. If the isocyanate is phenyl isocyanate, the product will be 5-(3-phenylureido)-3-ethyl-1,4-dimethylpyrazole.

EXAMPLE 2

Preparation of 5-amino-4-bromo-1,3-dimethylpyrazole

Eleven and one-tenths parts of 5-amino-1,3-dimethylpyrazole is dissolved in a mixture of 100 parts of acetic acid and 10 parts of sodium acetate. Thereafter, 16 parts of bromine is added slowly to the solution while maintaining good agitation. After the bromine addition is complete, the material is poured onto about 300 parts of crushed ice. The mixture is made slightly alkaline with aqueous ammonia and there extracted with methylene chloride. Upon drying with anhydrous magnesium sulfate and removal of the solvent under reduced pressure, 5-amino-4-bromo-1,3-dimethylpyrazole is recovered as a heavy oil. The compound has the following structure:

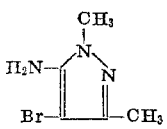

EXAMPLE 3

Preparation of 5-(3-phenylureido)-4-bromo-1,3-dimethylpyrazole

One part of 5-amino-4-bromo-1,3-dimethylpyrazole is dissolved in 20 parts of benzene. Two parts of phenyl isocyanate is added to the solution and boiled under reflux for one hour. Upon cooling, the solids are collected by filtration and purified by recrystallization from ethanol. The product recovered is 5-(3-phenylureido)-4-bromo-1,3-dimethylpyrazole having a melting point of about 220° C. and the following structure:

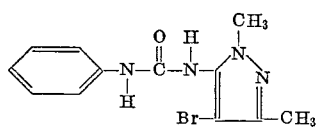

EXAMPLES 4–7

The following isocyanates when substituted in the amounts indicated for phenyl isocyanate in the procedure of Example 3 react to give the product indicated.

EXAMPLE 8

Preparation of 5-(3-cyclohexylureido)-1,3-dimethylpyrazole

Three and three tenths parts of 5-amino-1,3-dimethylpyrazole is dissolved in 50 parts of benzene. Three and eight tenths parts of cyclohexyl isocyanate is added and the mixture warmed on a steam bath for one hour. Upon cooling and addition of n-hexane, solids form which are collected by filtration and purified by recrystallization from acetonitrile. The product has a melting point of 196° C. and the following structure:

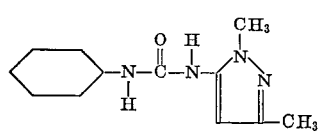

| Example | Isocyanate | Parts | Product |
|---|---|---|---|
| 4 | P-Chlorophenyl isocyanate | 2.5 | 5-[3-(4-chlorophenyl)ureido]-4-bromo-1,3-dimethylpyrazole |
| 5 | o-Bromophenyl isocyanate | 2.7 | 5-[3-(2-bromophenyl)ureido]-4-bromo-1,3-dimethylpyrazole |
| 6 | o-Fluorophenyl isocyanate | 2.2 | 5-[3-(2-fluorophenyl)ureido]-4-bromo-1,3-dimethylpyrazole |
| 7 | p-tolyl isocyanate | 2.2 | 5-(3-p-tolylureido)-4-bromo-1,3-dimethylpyrazole |

EXAMPLES 9–12

The following isocyanates when substituted in the amounts indicated for cyclohexyl isocyanate in the procedure of Example 8 react to give the product indicated.

| Example | Isocyanate | Parts | Product |
|---|---|---|---|
| 9 | o-Fluorophenyl isocyanate | 4.0 | 5-[3-(2-fluorophenyl)ureido]-1,3-dimethylpyrazole |
| 10 | 3,4-dichlorophenyl isocyanate | 5.7 | 5-[3-(3,4-dichlorophenyl)ureido]-1,3-dimethylpyrazole |

| Example | Isocyanate | Parts | Product |
|---|---|---|---|
| 11 | m-Nitrophenyl isocyanate | 5.1 | 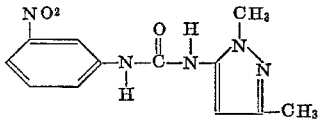<br>5-[3-(3-nitrophenyl)ureido]-1,3-dimethylpyrazole |
| 12 | o-Bromophenyl isocyanate | 6.0 | 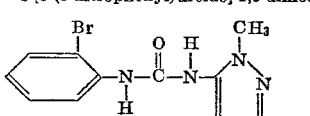<br>5-[3-(2-bromophenyl)ureido]-1,3-dimethylpyrazole |

EXAMPLE 13

Preparation of 5-[3-(2-fluorophenyl)ureido]-1,3-dimethyl-4-chloropyrazole

Six parts of 5-[3-(2-fluorophenyl)ureido]-1,3-dimethylpyrazole is dissolved in a warm solution of 4 parts of sodium acetate and 200 parts of acetic acid. Three and one-half parts of sulfuryl chloride is added to the solution which is then agitated for 15 minutes. The mixture is poured into 500 parts of ice water. Precipitated solids are collected by filtration and recrystallization from methanol. The recovered compound has a melting point of 210° C. and the following structure:

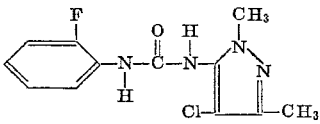

EXAMPLE 14

Preparation of 5-(3-methyl-3-phenyl-ureido)-1,3-dimethylpyrazole

Eleven and one-tenth parts of 5-amino-1,3-dimethylpyrazole is dissolved in a mixture of 200 parts of benzene and 10 parts of pyridine. Seventeen parts of N-methyl-N-phenylcarbamoyl chloride is added and the resulting mixture agitated and boiled under reflux for one hour. The mixture is then cooled and washed in order with (i) a 1 N sodium hydroxide solution, (ii) 1 N hydrochloric acid, and (iii) water. After drying with anhydrous magnesium sulfate and evaporation of the solvent, a good grade of crude subject compound remains. The pure compound has the following structure:

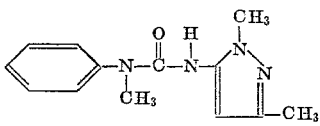

UTILITY

The compounds of this invention are useful as plant defoliants and accordingly can be used to cause the leaves to drop from numerous plants. This ability to cause leaves to drop is most useful on plants such as cotton, soybeans, seed alfalfa, and dry beans before harvest. The compounds also retard the rate of regrowth of the defoliated plants.

The amount of compound required for optimum effects will depend on the particular crop and environment under which it is growing. Within the meaning of this case, the amount of compound necessary to accomplish defoliation will be termed an "effective amount." Normally, the rate at which the compound is applied will range from 0.10 to 15.0 kilogram per hectare. One skilled in the art will be able to select the appropriate rate of application for any particular situation.

Compositions

The compounds of the present invention can be used in the form of compositions which are prepared by admixing at least one of the active compounds with an inert diluent, such as pest control adjuvants or modifiers, to provide compositions in the form of dusts, water-dispersible powders, high-strength concentrates, and aqueous or organic dispersions. Thus, the compounds of this invention can be used with a carrier or diluent agent such as a finely divided solid, an organic liquid, water, a wetting agent, a dispersing agent, an emulsifying agent, or any suitable combination of these.

The compositions, especially liquids and wettable powders, may contain as a conditioning agent one or more surface-active agents, sometimes called surfactants, in amounts sufficient to render a given composition containing the compounds of this invention readily dispersible in water or in oil.

The surface-active agent used in this invention can be a wetting, dispersing, or an emulsifying agent which will assist dispersion of the compound. The surface-active agent can include such anionic, cationic, and nonionic agents as have heretofore been generally employed in plant control compositions of similar type. Suitable surface-active agents are set forth, for example, in "Detergents and Emulsifiers" 1968 Annual by John W. McCutcheon, Inc.

In general, less than 10% by weight of the surface-active agent will be used in compositions of this invention and ordinarily the amount of surface-active agents will range from 1% to 5%, but may even be less than 1% by weight.

Additional surface-active agents can be added to the formulations to increase the ratio of surfactant to active ingredient up to as high as 5 to 1 by weight. Such compositions have a greater regulatory effectiveness than can be expected from a consideration of the activity of the components used separately. When used at higher rates it is preferred that the surfactant be present in the range of one-fifth to five parts surfactant for each one part of active agent.

(A) Wettable powders

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the active compounds are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate, and calcium sulfate dihydrate.

Suitable surfactants for use in such compositions are those listed in "Detergents and Emulsifiers" 1968 Annual by J. W. McCutcheon, Inc. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene- and alkylnaphthalenesulfonates; sulfated fatty alcohols, long-chain acid esters of sodium isethionate; esters of sodium sulfosuccinate; sulfated or sulfonated fatty acid esters; petroleum sulfonates; sulfonated vegetable oils; and di-tertiary acetylenic glycols. Preferred dispersants are methylcellulose, polyvinyl alcohol, lignin sulfonates, polymeric alkylnaphthalenesulfonates, polymethylene bis-naphthalenesulfonate, and sodium N-methyl-N-(long chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will usually contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

(B) High strength compositions and aqueous suspension concentrates

High-strength compositions generally consist of 90 to 99.5% active ingredient and 0.5 to 10% of a liquid or solid surfactant such as those described in "Detergents and Emulsifiers" 1968 Annual by J. W. McCutcheon, Inc. Up to approximately half of the surfactant may be replaced by an anti-caking agent such as a synthetic silica. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents. Thus, there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15% to 55% of active ingredient, from 40% to 70% water with the remainder made up of surfactants, corrosion inhibitors, and suspending agents.

Suspensions in organic liquids can be prepared in a similar manner such as by replacing the water with mineral oil.

(C) Dusts

Dusts are dense powder compositions which are intended for application in dry form and are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust."

Preferred grinding aids are attapulgite clay, diatomaceous, silica, synthetic fine silica and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will usually comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

The following examples illustrate the use of the compounds and compositions of this invention. Unless otherwise stated, parts are parts by weight.

EXAMPLE 15

|   | Percent |
|---|---|
| 5-(3-phenylureido)-1,3-dimethylpyrazole | 84.0 |
| Attapulgite clay | 7.5 |
| Magnesium carbonate | 2.0 |
| Sodium lignin sulfonate | 1.5 |
| Finely divided synthetic silica | 2.0 |
| Sodium alkylnaphthalenesulfonate | 3.0 |

The above ingredients are blended, micropulverized to a particle size essentially below 50 microns and reblended.

One kilogram of 5-(3-phenylureido)-1,3-dimethylpyrazole formulated as above is suspended in 200 liters of water and applied to a hectare of cotton on which the bolls are open and ready to pick. The treatment accomplishes complete defoliation within 10 days and the cotton can then be machine harvested without contamination with trash or without leaf stains. The treatment also prevents regrowth of the defoliated plants until they are harvested.

EXAMPLE 16

| | Percent |
|---|---|
| 5-[3-(2-fluorophenyl)ureido]-4-chloro-1,3-dimethylpyrazole | 25.0 |
| Montmorillonite clay | 69.0 |
| Finely divided synthetic silica | 2.0 |
| Calcium lignin sulfonate | 3.0 |
| Dioctyl sodium sulfosuccinate | 1.0 |

The above ingredients are blended and micropulverized to a particle size smaller than 100 microns and then are reblended.

Two kilograms of the above formulation are suspended in 100 liters of water containing 0.5% "Tween 20" (polyoxyethylene sorbitan monolaurate). Two weeks before harvest is planned, the formulation is sprayed on a hectare of late sown soybeans that still has green foliage but the pods are full. This treatment defoliates the plants and allows the pods to dry so that they combine easily when harvested.

EXAMPLE 17

| | Percent |
|---|---|
| 5 - [3 - (2 - fluorophenyl)ureido]-1,3-dimethylpyrazole | 95.0 |
| Trimethylnonyloxypolyethoxyethanol | 2.0 |
| Finely divided synthetic silica | 3.0 |

The above ingredients are blended, micropulverized to pass a 0.25 mm. screen and reblended. This formulation is suitable for further formulation or can be applied directly.

Two kilograms of 5-[3-(2-fluorophenyl)ureido]-1,3-dimethylpyrazole as formulated above are suspended in 200 liters of water containing 0.5% Triton X-100 wetting agent (octyl phenoxy polyethoxyethanol) and sprayed on a hectare of cotton two weeks before harvest is planned. The treatment causes rapid defoliation of the cotton plants, the bolls dry and the lint is easily picked by machine two weeks after treatment. The treated area yields clean high quality lint.

EXAMPLE 18

| | Percent |
|---|---|
| 5-(3-cyclohexylureido)-1,4-dimethyl - 3 - ethylpyrazole | 30.0 |
| Calcium lignin sulfonate and wood sugars | 15.0 |
| Hydrated attapulgite | 1.5 |
| Sodium pentachlorophenate | 0.5 |
| Sodium carbonate | 1.0 |
| Water | 52.0 |

The above solid ingredients are micropulverized to pass a 0.59 mm. screen, mixed with the water and sand-ground to a particle size essentially below 5 microns.

A suspension containing 4 kilograms of 5-(3-cyclohexylureido)-1,4-dimethyl-3-ethylpyrazole as formulated above and 150 liters of water containing 0.25% "Triton B 1956" wetting agent (modified phthalic glycerol alkyd resin) is sprayed on a hectare of dry beans two weeks before harvest is planned. The pods are full and about ready for harvest but not dry. The treatment defoliates the plants and allows the bean pods to dry. When harvested they shell cleanly with a minimum of cracked or lost seed.

EXAMPLE 19

| | Percent |
|---|---|
| 5-[3 - (3,4 - dichlorophenyl)ureido] - 1 - ethyl-3-methyl-4-chloropyrazole | 25.0 |
| Heavy aromatic naphtha | 65.0 |
| Oil-soluble calcium sulfonate | 5.0 |
| Alkyl phenoxypolyethoxy ethanol | 5.0 |

The active compound is micropulverized to pass an 0.59 mm. screen and is then blended with other ingredients and sand-ground to a particle size essentially below 5 microns. The resulting suspension can be emulsified into water.

Three kilograms of 5-[3-(3,4-dichlorophenyl)ureido]-1-ethyl-3-methyl - 4 - chloropyrazole formulated as described above are suspended in 300 liters of water and sprayed on a hectare of soybeans two weeks before harvest is planned. The treatment defoliates the plants and allows the pods to dry. The dry pods combine easily and cleanly and there are a minimum of beans lost in harvesting.

EXAMPLE 20

| | Percent |
|---|---|
| 5 - (3-methyl-3-phenylureido)-3-methylpyrazole | 50.0 |
| Kaolinite | 47.0 |
| Methylcellulose | 1.0 |
| Sodium alkylnaphthalenesulfonate | 2.0 |

The above ingredients are blended, micropulverized to a particle size essentially below 50 microns and reblended.

A suspension containing 2 kilograms of 5-(methyl-3-phenylureido)-3-methylpyrazole and 300 liters of water containing 0.25% "Tween 20" wetting agent is prepared. This is sprayed on a hectare of seed alfalfa when the seeds are full but not dry. The treatment defoliates the plants rapidly and makes it possible to harvest the seed with a minimum of loss.

EXAMPLE 21

| | Percent |
|---|---|
| 5 - [3-(3-nitrophenyl)ureido] - 1,3 - dimethyl-4-chloropyrazole | 50.0 |
| Diatomaceous silica | 44.5 |
| Sodium lauryl sulfate | 2.0 |
| Finely divided synthetic silica | 2.0 |
| Partially desulfonated sodium lignin sulfonate | 1.5 |

The above ingredients are blended, air-milled to a particle size essentially less than 20 microns and reblended.

Five kilograms of 5-[3-(3-nitrophenyl)ureido]-1,3-dimethyl-4-chloropyrazole formulated as shown above are suspended in 200 liters of water containing 0.5% "Triton X-100" wetting agent and sprayed on a hectare of cotton three weeks before harvest is planned. The treatment defoliates the cotton and retards regrowth until the crop is harvested. When harvested the crop gives a good yield of clean, unstained, high quality lint.

I claim:
1. A compound having the formula:

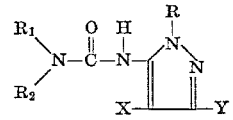

wherein
R is hydrogen, methyl, ethyl, or phenyl;
R₁ is cyclohexyl, or

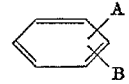

wherein
A is hydrogen, fluoro, chloro, bromo, or methyl, and
B is hydrogen, chloro, or nitro;
R₂ is hydrogen or methyl;
X is hydrogen, methyl, bromo, or chloro; and
Y is methyl or ethyl.

2. The compound of the formula in claim 1 which is 5-(3-phenylureido)-1,3-dimethylpyrazole.

3. The compound of the formula in claim 1 which is 5-[3-(2-fluorophenyl)ureido]-4-chloro - 1,3 - dimethylpyrazole.

(References on following page)

References Cited

Anderson et al.: J. Med. Chem., vol. 7, pages 259–68 (1964), RS1.J5.

Dorn et al.: Chem. Abstr., vol. 63, columns 16330–1, (1965), QD1.A51.

Dymek et al.: Chem. Abstr., vol. 63, columns 18066–7, (1965), QD1.A51.

Dymek et al.: Chem. Abstr., vol. 70, abstract 77872p (1969), QD1.A51.

Musante et al.: Chem. Abstr., vol. 55, columns 3558–9, (1961), QD1.A51.

NATALIE TROUSOF, Primary Examiner

U.S. Cl. X.R

71—92; 260—465.5 R